O. JONES.
LOOKOUT POLES FOR SEINE-BOATS.
No. 186,424. Patented Jan. 23, 1877.
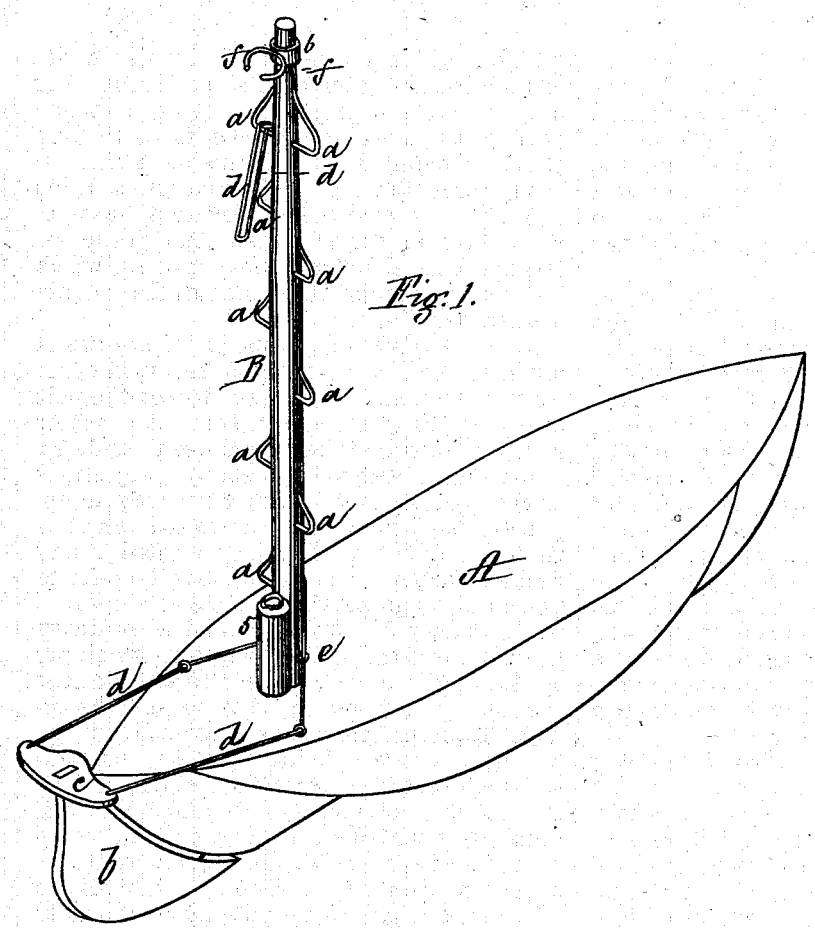
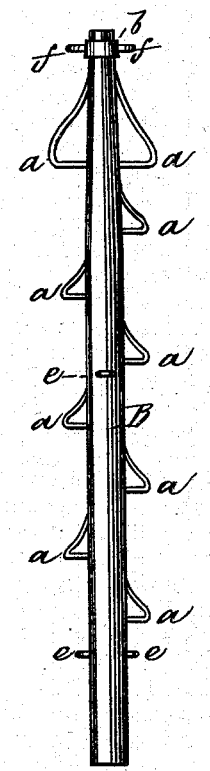

UNITED STATES PATENT OFFICE.

OWEN JONES, OF GLOUCESTER, MASSACHUSETTS.

IMPROVEMENT IN LOOKOUT-POLES FOR SEINE-BOATS.

Specification forming part of Letters Patent No. 186,424, dated January 23, 1877; application filed December 2, 1876.

*To all whom it may concern:*

Be it known that I, OWEN JONES, of Gloucester, in the county of Essex and State of Massachusetts, have invented a Lookout for Seine-Boats, used in fishing for mackerel, porgies, &c., of which the following is a full, clear, and exact description, reference being had to the accompanying drawings, making part of this specification, in which—

Figure 1 is a perspective view of a seine-boat, having my lookout applied thereto. Fig. 2 is an elevation of the lookout-pole detached.

In seine fishing for mackerel, porgies, &c., it is customary to keep a man aloft on the lookout to discover the whereabout of any school of fish which may be in the vicinity, for the reason that a person in an elevated position can see fish beneath the surface of the water which, under certain circumstances, cannot be seen from the deck of the vessel. When, however, the seine-boat starts out from the vessel the men often lose sight of the fish, owing to their not being visible from the boat, no opportunity being afforded therein for a man to gain an elevated position, which frequently results in the failure to capture any fish.

My invention has for its object to entirely overcome this difficulty; and consists in the application to a seine-boat of a lookout-pole, provided with a series of steps, projections, or footholds, which afford a convenient means of reaching the top, from which a man can readily discover the location of a school of fish, and keep them in view, so that the boat can be steered to the desired point.

My invention, furthermore, consists, in a device applied to the top of the lookout-pole, for partially supporting the body of the lookout while at the upper end of the pole, whereby the necessity of holding on is avoided, and both hands left free to operate the steering-lines.

To enable others skilled in the art to understand and use my invention, I will proceed to describe the manner in which I have carried it out.

In the said drawings, A represents a seine-boat of ordinary construction, which is provided with a step or socket, into which is fitted a lookout-pole, B, of suitable length and stiffness. This pole is provided with a series of projections, a, composed of metal rods, bent as shown, these projections being arranged on opposite sides of the pole, so as to form steps or footholds, which enable a man to easily reach the top of the pole, from which position, on account of its elevation, he is enabled to see a school of fish beneath the water, and keep them constantly in view, which is desirable, as it greatly increases the chances of their capture.

The two upper projections or loops a are of much larger size than those below, in order that the man stationed at the top of the pole may pass his legs through them and assume a sitting posture, if he should desire to do so.

Instead of bent rods, as shown, projections or footholds of any desired form may be applied to the pole B to facilitate the ascent to its top, and the pole may be located in any desired portion of the boat; but I prefer to place it aft, against the pump 5, as shown.

The rudder b is provided with an ordinary yoke, c, the steering-lines d d from which are led through eyes or guides e to a point near the top of the lookout-pole B, so as to be accessible to the man there stationed, who is, by this means, enabled to steer the boat himself to the exact spot required, thus avoiding the necessity of pointing or otherwise communicating with a steersman below, as would otherwise be required, and which would be objectionable, for the reason that the position of the fish might thereby be made known to other competing boats or vessels.

The yoke and steering-lines may, however, be dispensed with, if desired, and the boat steered with a tiller, in the ordinary manner.

The lookout-pole B is provided, near its top, with a ring or band, 6, from which project two curved arms, f f, which are intended to partially encircle and support the body of the lookout while standing or sitting, whereby the necessity of holding on is avoided, and both hands are consequently left free to operate the steering-lines, the space between the outer ends of the two arms f f being sufficient to admit the body when turned sidewise.

When the lookout-pole is not required for use, it is unshipped and stowed away with the oars in the crane-irons, attached to the side of the boat, and can be easily raised and adjusted in position when needed.

The above-described lookout-pole supplies a want long desired by fishermen, and by its use large quantities of fish may be taken which would otherwise be lost.

What I claim as my invention, and desire to secure by Letters Patent, is—

1. The combination of a lookout-pole, B, provided with a series of steps or footholds, with a seine-boat, substantially as and for the purpose set forth.

2. The combination of the support $ff$ with the lookout-pole B, substantially as and for purpose set forth.

Witness my hand this 18th day of November, A. D. 1876.

OWEN JONES.

In presence of—
CYRUS STORY,
GEO. A. UPTON.